US012654176B2

(12) United States Patent
Schwec et al.

(10) Patent No.: US 12,654,176 B2
(45) Date of Patent: Jun. 16, 2026

(54) BAFFLE ASSEMBLIES, NOZZLES, AND RELATED METHODS FOR SOLID DISCHARGES OF CENTRIFUGE SEPARATORS

(71) Applicant: Derrick Corporation, Buffalo, NY (US)

(72) Inventors: Michael Joseph Schwec, Boston, NY (US); David Joseph Holewka, West Seneca, NY (US)

(73) Assignee: Derrick Corporation, Buffalo, NY (US)

( * ) Notice: Subject to any disclaimer, the term of this patent is extended or adjusted under 35 U.S.C. 154(b) by 809 days.

(21) Appl. No.: 17/988,549

(22) Filed: Nov. 16, 2022

(65) Prior Publication Data

US 2023/0234076 A1 Jul. 27, 2023

Related U.S. Application Data

(60) Provisional application No. 63/302,955, filed on Jan. 25, 2022.

(51) Int. Cl.
*B04B 11/04* (2006.01)
*B04B 15/00* (2006.01)

(52) U.S. Cl.
CPC .............. *B04B 11/04* (2013.01); *B04B 15/00* (2013.01)

(58) Field of Classification Search
CPC . B04B 11/04; B04B 15/00; B04B 2001/2091; B04B 1/20; B04B 7/02; B04B 7/04; B04B 2007/025; B04B 11/02; B04B 11/06
USPC ......................................... 494/52, 53, 56, 60
See application file for complete search history.

(56) References Cited

U.S. PATENT DOCUMENTS 7,374,529 B2 * 5/2008 Hensley .................... B04B 1/20 494/53

FOREIGN PATENT DOCUMENTS

CN 215507318 U * 1/2022
WO WO-2010060432 A1 * 6/2010 ............... B04B 7/02

* cited by examiner

*Primary Examiner* — Claire X Wang
*Assistant Examiner* — Shuyi S. Liu
(74) *Attorney, Agent, or Firm* — FisherBroyles, LLP; Jason P. Mueller

(57) ABSTRACT

The present disclosure relates to baffle assemblies, nozzles, and related systems and methods for handling solid discharges of centrifuge separators. In one implementation, a two-piece baffle assembly configured to be positioned around discharge nozzles of a centrifuge separator includes a first segment and a second segment configured to attach to the first segment. The first segment includes a first baffle, a second baffle, and a first discharge gap formed between the first baffle and the second baffle. The second segment includes a frame having an arcuate shape, a third baffle extending inwardly relative to the arcuate frame, a fourth baffle extending inwardly relative to the arcuate frame, and a second discharge gap formed between the third baffle and the fourth baffle.

14 Claims, 15 Drawing Sheets

BAFFLE ASSEMBLIES, NOZZLES, AND RELATED METHODS FOR SOLID DISCHARGES OF CENTRIFUGE SEPARATORS

CROSS-REFERENCE TO RELATED APPLICATIONS

This application claims the benefit of U.S. Provisional Patent Application Ser. No. 63/302,955, filed Jan. 25, 2022, the entire contents of which are hereby incorporated by reference and the priority of which is hereby claimed.

FIELD OF THE DISCLOSURE

The present disclosure relates to nozzles, baffle assemblies, and related apparatus, systems, and methods for handling solid discharges of centrifuge separators.

BRIEF DESCRIPTION OF THE DRAWINGS

The accompanying drawings are part of the present disclosure and are incorporated into the specification. The drawings illustrate examples of embodiments of the disclosure and, in conjunction with the description and claims, serve to explain various principles, features, or aspects of the disclosure. Certain embodiments of the disclosure are described more fully below with reference to the accompanying drawings. However, various aspects of the disclosure may be implemented in many different forms and should not be construed as being limited to the example embodiments set forth herein.

Figure 1:
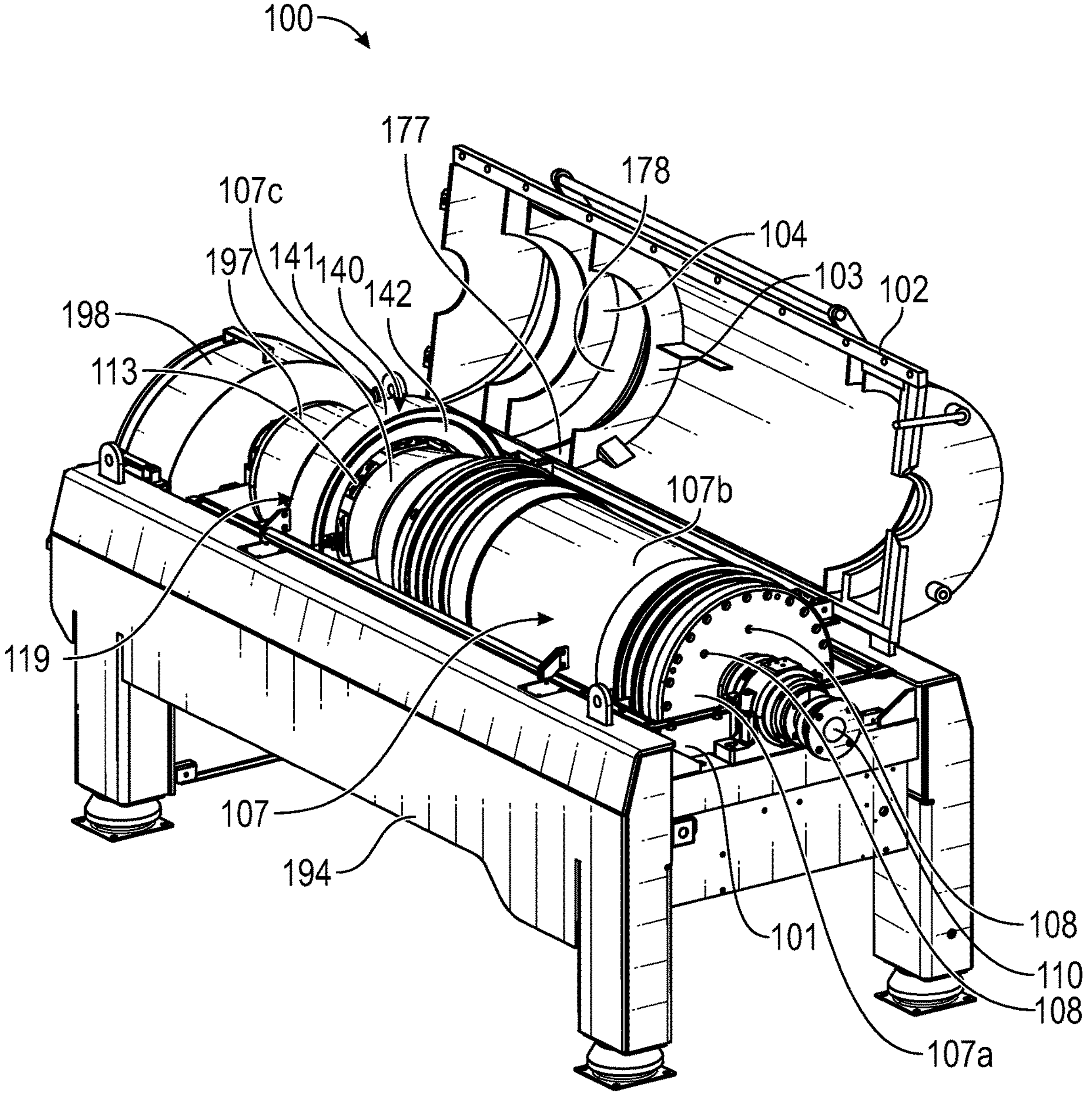
FIG. 1 is a partial isometric front view of a centrifuge separator according to an example of the present disclosure.

In the appended drawings, reference numbers that appear in more than one figure refer to the same structural feature. The drawings depict at least one example of each implementation, embodiment, or aspect to illustrate the features of the present disclosure and are not to be construed as limiting the disclosure thereto. It is contemplated that aspects, features, operations, components, elements, and/or properties in one implementation may be beneficially used in other implementations without specific recitation.

DETAILED DESCRIPTION

The present disclosure relates to baffle assemblies, nozzles, and related systems and methods for handling solid discharges of centrifuge separators. Centrifuge separators are commonly used to separate the solid and liquid components of an abrasive slurry.

In a centrifuge separator, solids of a slurry are discharged from nozzles located on a rotating bowl of the centrifuge separator. Ideally, the solids exiting the nozzles would fall into a chute or catch basin positioned below the nozzles. However, it is common for some fluid or moisture to be present in the solids discharged from the nozzles. As a result, some solids discharged from the nozzles can clump together and stick to inner surfaces of a casing that surrounds the rotating bowl. This includes inner surfaces of the casing that are located above and to the sides of the rotating bowl. When solids that have temporarily stuck to an inner surface of the casing fall away from the casing, they can contact the outer surfaces of the rotating bowl adjacent the nozzles, causing wearing and pitting of the outer surfaces of the rotating bowl.

After extended operations of the centrifuge separator, the wearing and pitting of the outer surfaces of the rotating bowl render the assembly structurally unsound. At that point, the centrifuge separator must be partially disassembled and the worn elements must be replaced. This type of maintenance is costly and results in significant machine down time.

Prior attempts to mitigate the problem of solids causing wear and pitting of elements of the centrifuge separator include the installation of "plows" on the exterior surface of the rotating bowl of the centrifuge separator. The "plow" elements operate to dislodge solids that have become temporarily affixed to inner surfaces of the casing surrounding the rotating bowl, causing the solids to move downward into the chute or catch basin positioned below the rotating nozzles. Unfortunately, it is often not possible for the plows to prevent solid materials from building up on all inner surfaces of the casing of the centrifuge separator. While plows may be operative to prevent the buildup of solids along portions of the casing swept by movement of the plows, there is still buildup of solids on portions of the casing to the sides of the plows. Those solids can still fall onto portions of the rotating bowl to the sides of the plows, causing pitting and wear on those surfaces of the bowl. Thus, plows fail to prevent pitting and wear on all portions of the bowl, and expensive maintenance is still needed on a periodic basis.

The present disclosure provides improvements to existing centrifuge separator designs, and in particular on how solids exiting the nozzles are handled. In one aspect of the present disclosure, a baffle assembly is disposed on a centrifuge separator such that the baffle assembly surrounds the nozzles on the rotating bowl. The baffle assembly acts to constrain how solids exiting the nozzles can move, preventing solids from adhering to portions of the inner surfaces of the casing to the sides of the nozzles. Because solids cannot adhere to inner surfaces of the casing to the sides of the nozzles, there is less of an issue with solids thereafter falling onto the surfaces of the rotating bowl to the sides of the nozzles. Thus, pitting and wear of the surface of the bowl to the sides of the nozzles is decreased, which in turn reduces the need for costly maintenance and repair actions, and the associated machine downtime.

In another aspect of the disclosure, the nozzles on the rotating bowl through which solids are ejected are configured to extend outward in the radial direction away from the outer surface of the rotating bowl. This results in solids exiting the tips of the nozzles at a location fully covered by side surfaces of the baffle assembly. This, in turn, helps to ensuring the baffle assembly is effective in constraining movement of the ejected solids, essentially reducing the amount of solids that can move sideways away from the nozzles.

Exemplary implementations of the present disclosure provide numerous benefits. The benefits include reduced wear of various surfaces, including surfaces of the rotatable bowl between the nozzles, surfaces of the rotatable bowl to the sides of the nozzles, surfaces of the nozzles, and surfaces of a casing of the centrifuge separator surrounding the rotating bowl. The benefits also include reduced accumulation of solids on the inner surfaces of the casing. These changes result in reduced maintenance costs, more machine uptime, increased operating lifespans for components, and lower overall operating costs.

Figure 2:
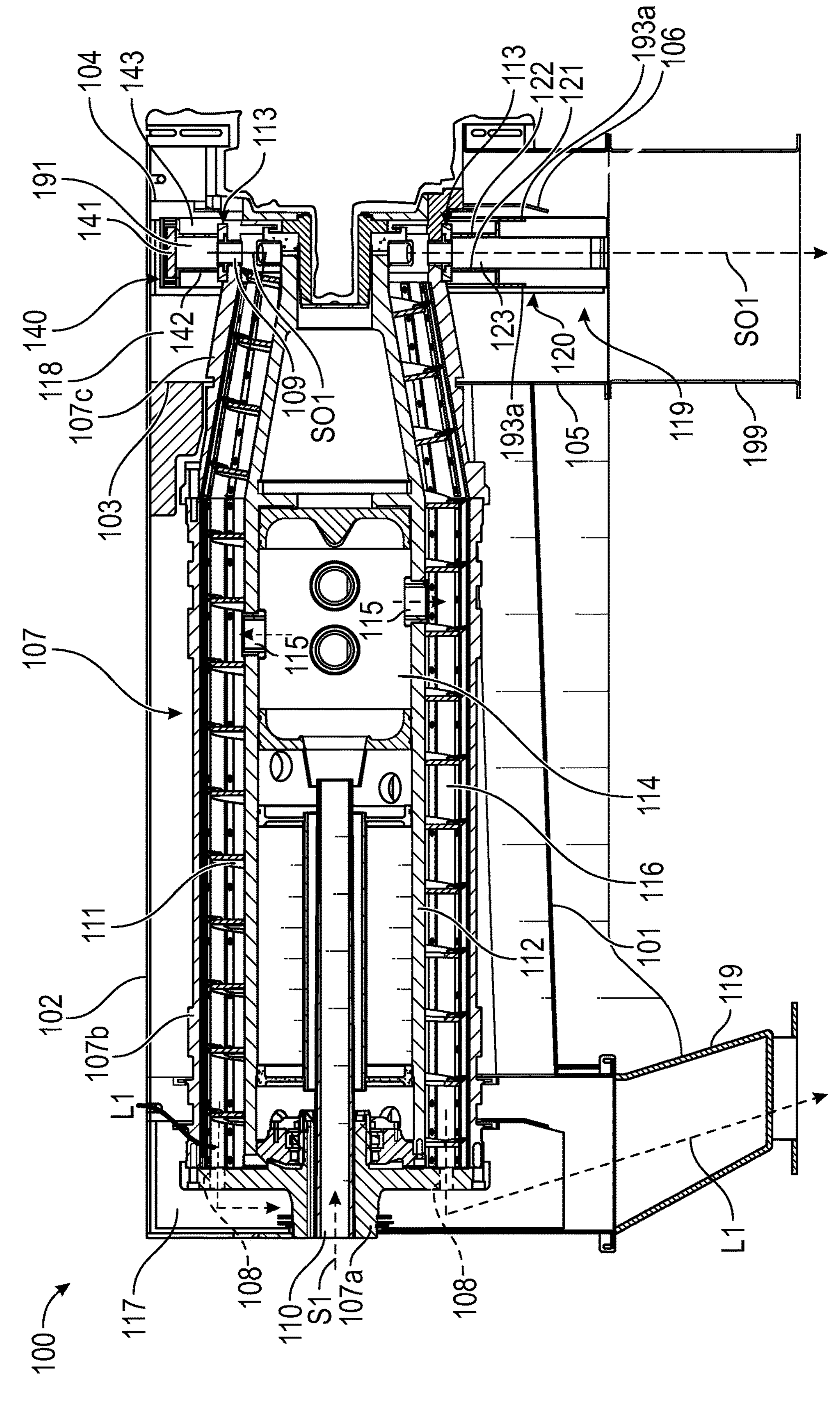
FIG. 2 is a partial side cross-sectional view of the example centrifuge separator shown in FIG. 1.

FIG. 1 is an isometric front view of an example of a centrifuge separator 100. FIG. 2 is a cross-sectional view of the centrifuge separator 100 shown in FIG. 1. The centrifuge separator 100 includes a lower case 101 and an upper case 102 attached to the lower case 101. The upper case 102 includes a first case baffle 103 and a second case baffle 104. The lower case 101 includes a third case baffle 105 and a fourth case baffle 106.

The centrifuge separator 100 includes a rotatable bowl 107. The rotatable bowl 107 includes a plurality of liquid discharge ports 108 (shown in ghost in FIG. 2), a plurality of solid discharge ports 109, and a slurry inlet 110. The centrifuge separator 100 includes a rotatable conveyor 111 positioned in the rotatable bowl 107, and an inner shaft 112 positioned in the rotatable bowl 110. The rotatable conveyor 111 can be a part of the inner shaft 112. The centrifuge separator 100 includes a plurality of nozzles 113 attached to the rotatable bowl 107. Each nozzle 113 of the plurality of nozzles 113 corresponds to a respective one of the plurality of solid discharge ports 109.

The present disclosure contemplates that the rotatable bowl 107 can be a single body, or the rotatable bowl 107 can include multiple bodies as is shown in the implementation in FIG. 2. In the example shown in FIG. 2, the rotatable bowl 107 includes an end cap 107*a*, a middle body 107*b*, and a bowl extension 107*c* attached together.

A baffle assembly 119 is disposed about the rotatable bowl 107. The baffle assembly 119 is a two-piece baffle assembly. The baffle assembly 119 includes a first segment 120 and a second segment 140 attached to the first segment 120. The first segment 120 includes a first baffle 121 and a second baffle 122 mounted to a first frame 192 of the first segment 120. Each of the first baffle 121 and the second baffle 122 is aligned between the first case baffle 103 and the second case baffle 104. Each of the first baffle 121 and the second baffle 122 is also aligned between the third case baffle 105 and the fourth case baffle 106. The first segment 120 includes a first discharge gap 123 formed between the first baffle 121 and the second baffle 122. The second segment 140 includes a second discharge gap 191 formed between the first baffle 121 and the second baffle 122.

The second segment 140 includes a second frame 141 having an arcuate shape, a third baffle 142 extending inwardly relative to the second frame 141, and a fourth baffle 143 extending inwardly relative to the second frame 141 and spaced from the third baffle 142. Each of the third baffle 142 and the fourth baffle 143 is aligned between the first case baffle 103 and the second case baffle 104. Each of the third baffle 142 and the fourth baffle 143 is also aligned between the third case baffle 105 and the fourth case baffle 106.

During operation of the centrifuge separator 100, a slurry Si flows through the slurry inlet 110 and into a slurry chamber 114 of the inner shaft 112. The slurry Si then flows through outlets 115 formed in the inner shaft 112 and into a bowl annulus 116. The rotatable bowl 107 and the rotatable conveyor 111 rotate during operation, such as at different rotational speeds. The rotatable conveyor 111 rotates with the inner shaft 112. Liquids L1 in the bowl annulus 116 are directed toward the end cap 107*a*, and solids SO1 are directed toward the bowl extension 107*c*. As the rotatable bowl 107 rotates, the liquids L1 are discharged out to a liquid chamber 117 through the plurality of liquid discharge ports 108, and the solids SO1 are discharged out to a solid chamber 118 through the plurality of solid discharge ports 109. During the discharge of the solids SO1, the first baffle 121, the second baffle 122, the second frame 141, the third baffle 142, and the fourth baffle 143 collect and/or deflect the discharged solids SO1. The solids SO1 can drop through the first discharge gap 123 and/or the solids SO1 can drop through the solid chamber 118 in an area exterior to the first segment 120 and the second segment 140. The liquids L1 drop through the liquid chamber 117 and exit through a liquid chute 119, and the solids SO1 exit through a solid chute 199.

In FIG. 1, the upper case 102 is pivoted relative to the lower case 101 to open the centrifuge separator 100 and provide access to the baffle assembly 119 and the rotatable bowl 107. One or more motors 198 are provided to rotate the rotatable bowl 107, the inner shaft 112, and the rotatable conveyor 111. The bowl extension 107*c* of the rotatable bowl 107 is connected to a motor of the one or more motors 198 through a drive sleeve 197. The lower case 101 and/or the upper case 102 can be attached to a support frame 194. Each of the lower case 101, the upper case 102, and the support frame 194 are part of a centrifuge frame.

Figure 3:
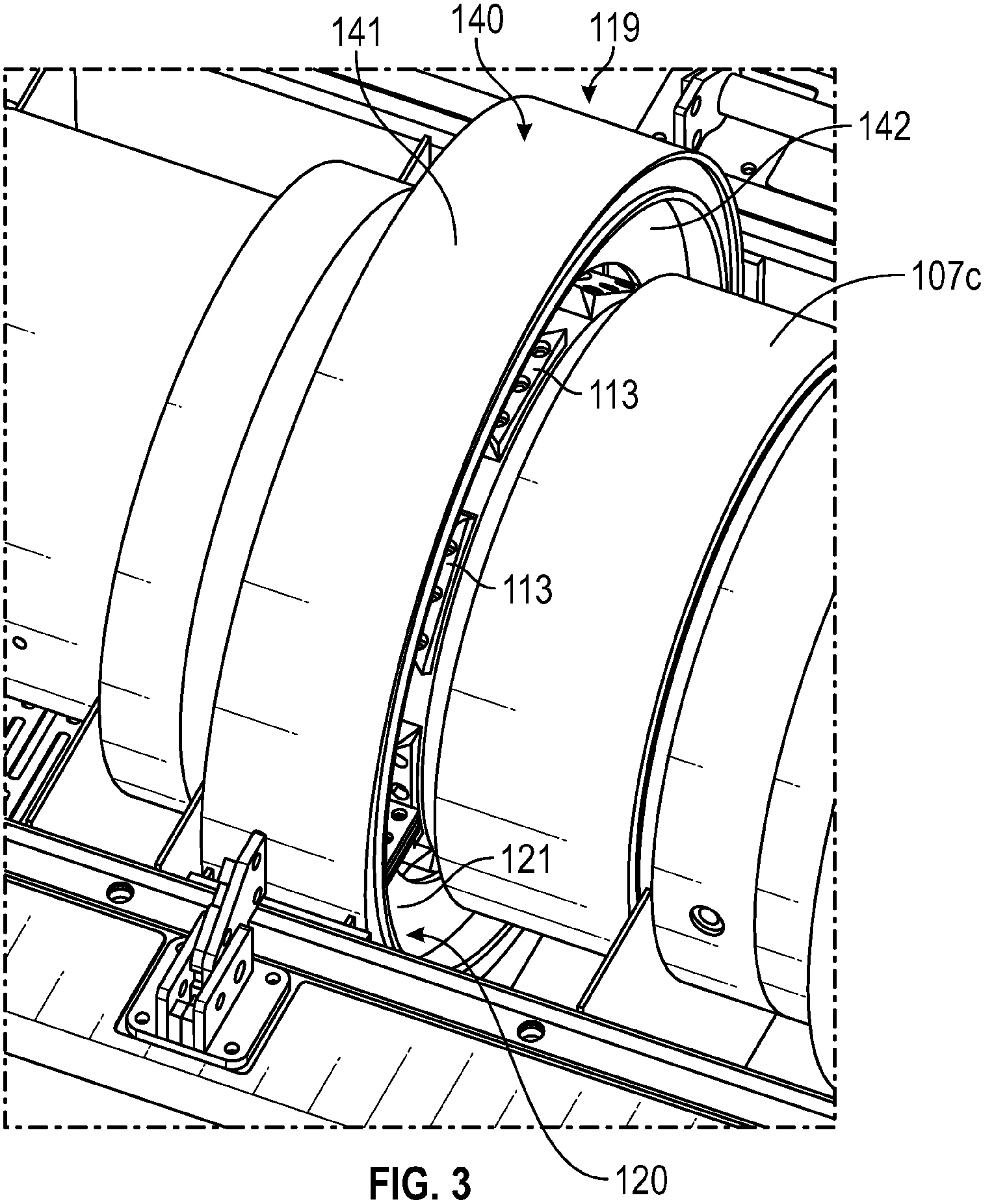
FIG. 3 is a partial isometric view of a baffle assembly of the example centrifuge separator shown in FIG. 1.
Figure 4:
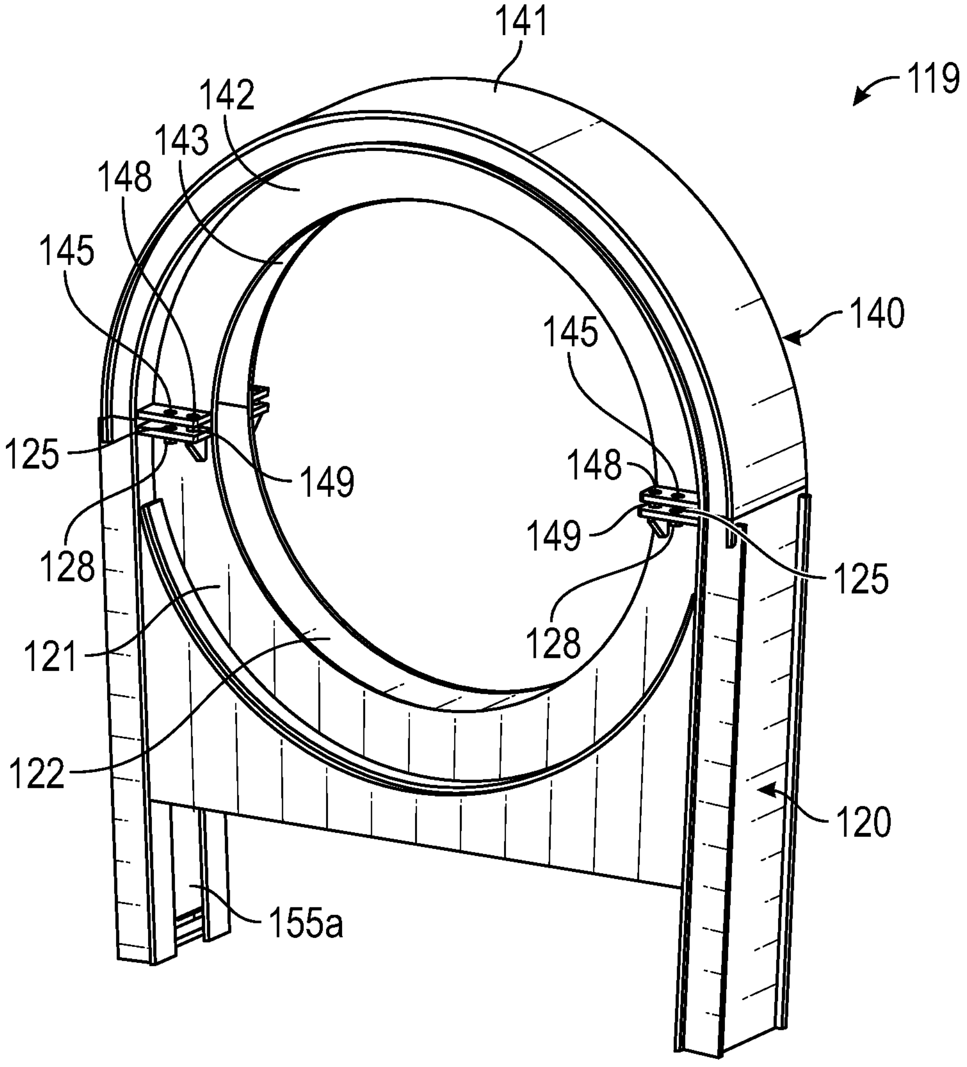
FIG. 4 is an isometric front view of the baffle assembly of the example centrifuge separator shown in FIGS. 1 to 3.
Figure 5:
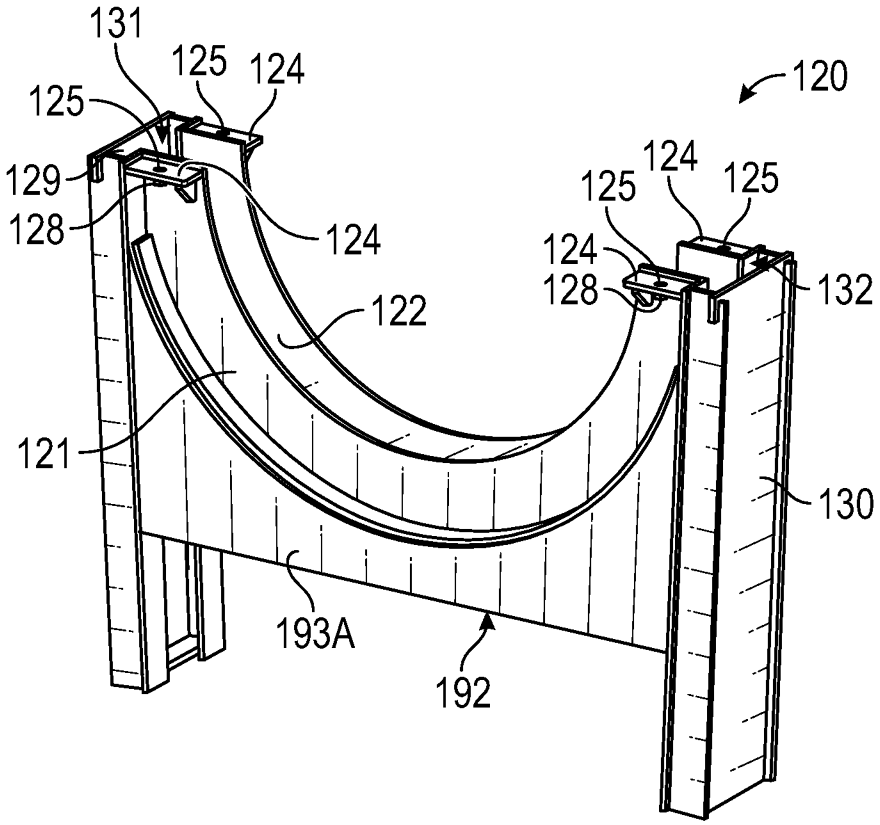
FIG. 5 is an isometric front view of a lower portion of the baffle assembly shown in FIG. 4.

FIG. 3 is an isometric view of the baffle assembly 119, according to one example. FIG. 4 is an isometric front view of the baffle assembly 119 shown in FIGS. 1 to 3. FIG. 5 is an isometric front view of the first segment 120 of the baffle assembly 119 shown in FIG. 4, and FIG. 6 is an isometric view of the second segment 140 of the baffle assembly 119.

The baffle assembly 119 includes an attachment arrangement for attaching the first segment 120 to the second segment 140. The first segment 120 of the baffle assembly 119, as illustrated in FIG. 5, includes mounting flanges 124 that each have one or more fastener openings 125. The second segment 140, as illustrated in FIG. 6 also includes mounting flanges 144 that each have one or more fastener openings 145. Each of the mounting flanges 144 may further include one or more jack openings 148 and corresponding jack nuts 149. The jack nuts are affixed to the flange 144 and are aligned with the jack openings 148. As will be explained below, the jack openings 148 and jack nuts 149 can be used to help separate the second segment 140 from the first segment 120 of the baffle assembly 119. In the example shown in FIGS. 4-6, the mounting flanges 124 extend from the first and second baffles 121/122, and the mounting flanges 144 extend from the third and fourth baffles 142/143. As shown in FIG. 4, the first, second, third, and fourth baffles 121/122, 142, 143 are configured such that when the first segment 120 is attached to the second segment 140, inner edges of the first and third baffles 121, 142 substantially form a circle and inner edges of the second and fourth baffles 122, 143 substantially form a circle.

The baffle assembly 119 is independent of, and provided separately from, the centrifuge frame of the centrifuge separator 100. The present disclosure contemplates that the baffle assembly 119 could be at least partially integrally formed with the centrifuge frame, or otherwise provided as part of the centrifuge frame. As an example, the first segment 120 could be integrally formed with lower case 101.

Figure 6:
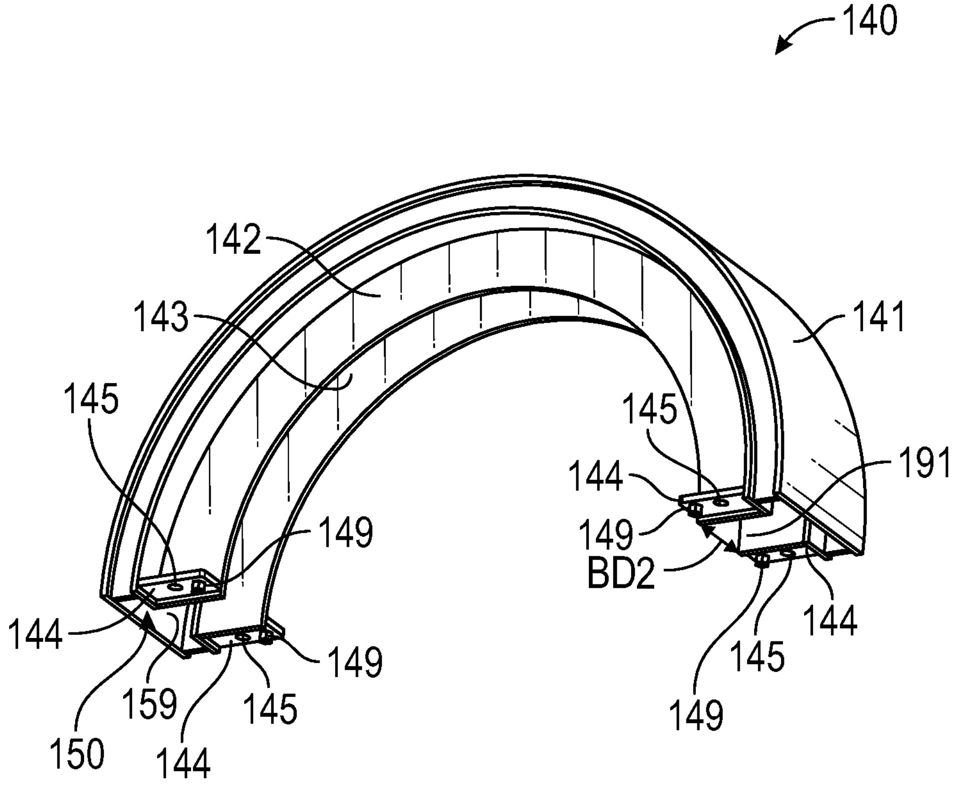
FIG. 6 is an isometric front view of an upper portion of the baffle assembly shown in FIG. 4.

Referring to FIG. 6, the second segment 140 includes a first channel 150 defined at least partially by the second frame 141. The first channel 150 is arcuate in shape.

Referring to FIG. 5, the first frame 192 of the first segment 120 includes a first outer section 129 positioned outwardly of a first side of the first baffle 121 and the second baffle 122, and a second outer section 130 positioned outwardly of a second side of the first baffle 121 and the second baffle 122, and two middle sections 193*a*, 193*b* extending between the first and second outer sections 129/130. The first segment 120 includes a second channel 131 defined at least partially by the first outer section 129, and a third channel 132 defined at least partially by the second outer section 130. Each of the second and third channels 131, 132 is configured to receive ends 155*a*, 155*b* of a wear liner 155 (shown in FIG. 7) extending away from the second segment 140 (as shown in FIG. 8).

Figure 7:
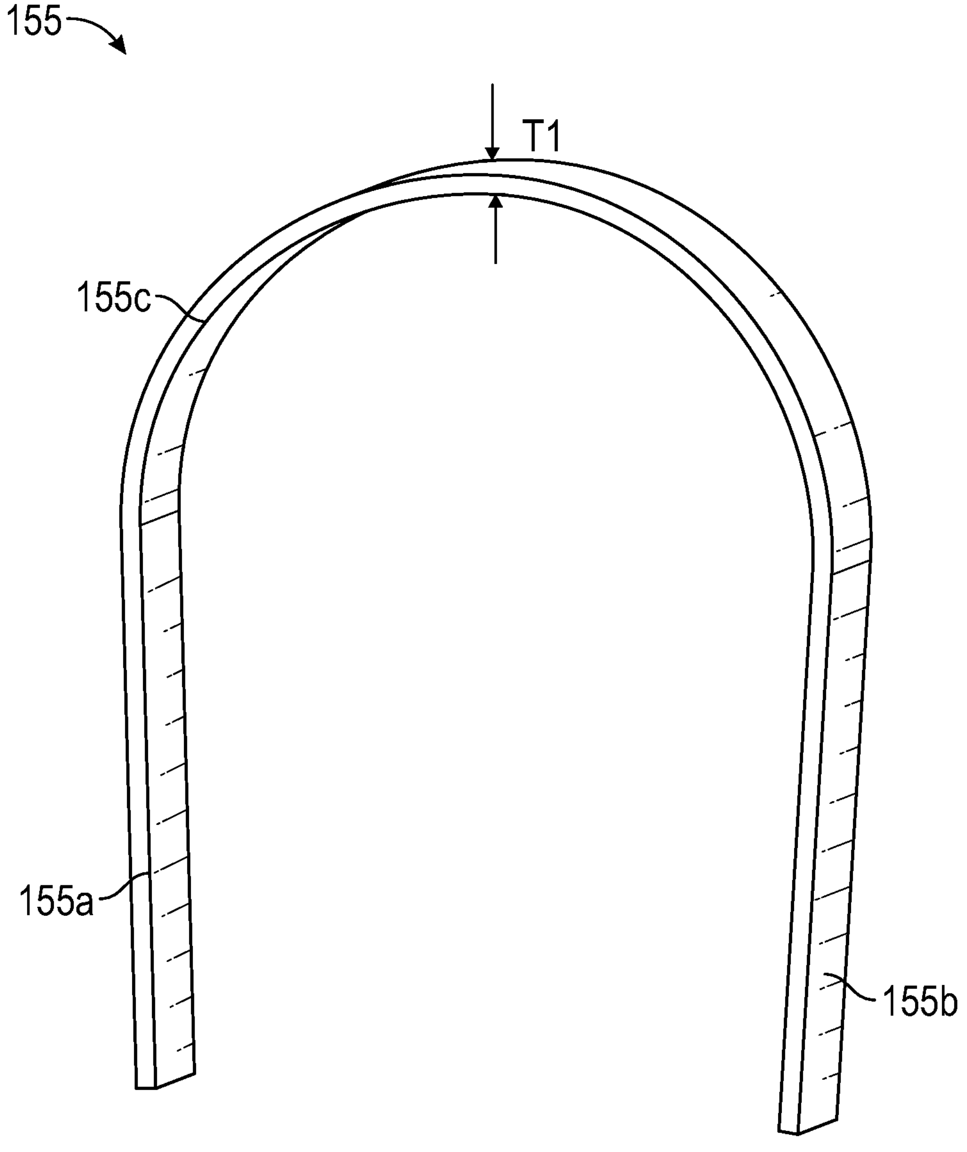
FIG. 7 is an isometric front view of an example of a wear liner that could be used in the baffle assembly shown in FIGS. 4 to 6.
Figure 8:
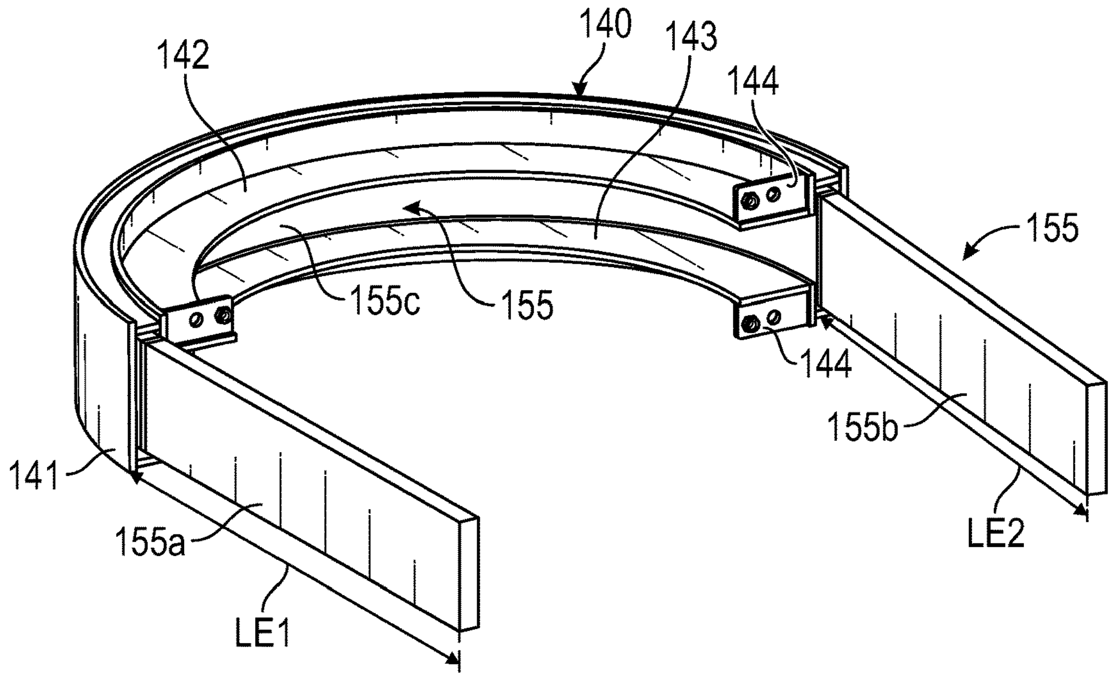
FIG. 8 is an isometric bottom view of the wear liner installed in the upper portion of the baffle assembly shown in FIG. 6.

FIG. 7 is an isometric front view of the wear liner 155, according to one example. FIG. 8 is an isometric view illustrating the wear liner 155 installed in the second segment 140 of the baffle assembly 119. The wear liner 155 is a part of the baffle assembly 119. As shown in FIG. 8, the wear liner 155 is positioned to extend through the first channel 150 of the second segment 140. The wear liner 155 lines an inner surface 159 (shown in FIG. 6) of the second frame 141. The wear liner 155 extends through the first channel 150 such that ends 155*a*, 155*b* of the wear liner extend outward from the first channel 150 by a first length LE1 and a second length LE2, respectively. In exemplary embodiments the first length LE1 and the second length LE2 are substantially equal, such as within a difference of 5% or less relative to each other. When the first segment 120 of the baffle assembly 119 is joined to the second segment 140, the extending liner portions 155*a*, 155*b* extend down into the second and third channels 131, 132 of the first segment 120.

As shown in FIG. 7, the wear liner 155 has a thickness T1. In exemplary embodiments, the thickness T1 can be about 0.75 inches. Of course, in alternate embodiments the thickness T1 could have different dimensions.

In FIG. 7, the wear liner 155 is shown in a partially arcuate configuration that matches the configuration (shown in FIG. 8) in which the wear liner 155 extends through the second segment 140. The wear liner 155 includes an arcuate portion 155*c* that is positioned in the first channel 150 (as shown in FIG. 8). In one or more embodiments, the wear liner 155 is formed of a urethane material. The wear liner 155 can be formed of other materials that exhibit a beneficial hardness, durability, chemical resistance, and/or abrasion resistance. In one or more embodiments, the wear liner 155 is formed of ethylene-propylene diene monomer (EPDM) and/or one or more abrasion resistant elastomers, such as one or more rubbers. The wear liner 155 helps to prevent wear of the first and second segments 120, 140 of the baffle assembly 119. The wear liner 155 is designed to be replaced over time after wear has occurred. Aspects described herein (such as aspects of the first and second segments 120, 140) facilitate quickly and easily replacing the wear liner 155. For example, removing the second segment 140 from the first segment 120 facilitates quickly replacing the wear liner 155 and/or quickly servicing the second segment 140, the first segment 120 and/or the rotatable bowl 107. The configurations of the segments 120, 140 also facilitate a continuous path for discharged solids SO1 to flow through until dropping.

Figure 9:
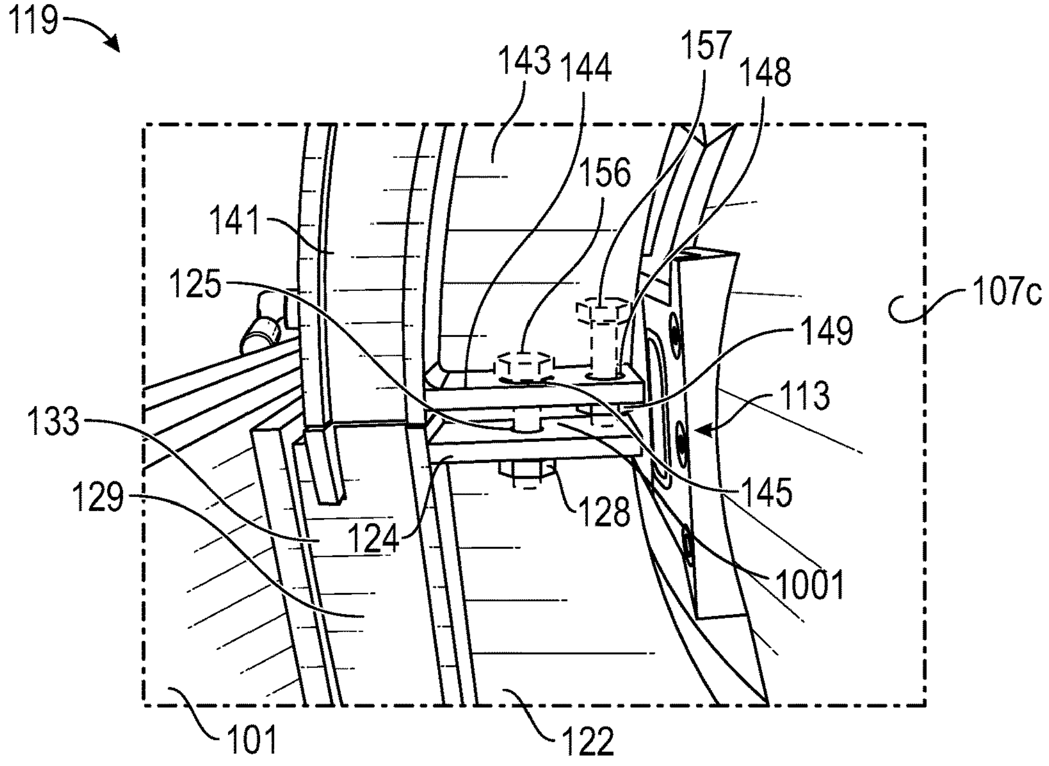
FIG. 9 is a partial view of the baffle assembly illustrating an example of how the upper and lower portions of the baffle assembly are joined together.

FIG. 9 illustrates how the first segment 120 is joined to the second segment 140 of the baffle assembly. The fastener openings 125/145 on the flanges 124/144 align with one another, and a fastener 156 (shown in dashed lines in FIG. 9) secures the second segment 140 to the first segment 120. In one or more embodiments, a threaded nut 128 may be affixed to one of the flanges 124/144, and a threaded bolt 156 (shown in dashed lines in FIG. 9) passing through the fastener openings 125/145 attaches to the threaded nut 128. During operation of the centrifuge separator 100, the baffle assembly 119 is substantially stationary. For example, the baffle assembly 119 does not complete any full rotations. There may be some movement of the baffle assembly 119. For example, the baffle assembly 119 may move due to vibrations of the centrifuge separator 100.

The second segment 140 can be detached from the first segment 120 by removing the fasteners 156 from the respective fastener openings 125/145 such that the second segment 140 can be separated from the first segment 120 and be raised away from the first segment 120. The wear liner 155 would remain in the second segment 140 when the second segment 140 is removed from the first segment 120.

If the segments 120, 140 resist separation from each other, one or more jack screws 157 (shown in dashed lines in FIG. 9) can be extended through the respective jack openings 148 and threaded into the respective jack nuts 149 on the flanges 144 of the second segment 140. The jack screws 157 can be, for example, threaded bolts. The jack screws bear against the upper surfaces of the flanges 124 on the first segment 120, and rotation of the jack screws 157 push the second segment 140 apart from the first segment 120. The present disclosure contemplates that the fasteners 156 used to attach the first segment 120 to the second segment 140 also can be used as the jack screws 157. For example, the fasteners 156 can be removed to detach the second segment 140 from the first segment 120, and then the same fasteners 156 can be used as the jack screws (e.g., in place of the jack screw 157 shown as dashed in FIG. 9) to help separate the first and second segments 120, 140.

In the example described above, jack openings 148 and jack nuts 149 were provided on the flanges 144 of the second segment 140 and jack screws 157 bear against the flanges 124 on the first segment 120. This arrangement could be reversed such that jack openings and jack nuts are provided on the flanges 124 of the first segment 120 and jack screws bear against the flanges 144 on the second segment 140 to separate the first and second segments 120/140. In such an embodiment, the jack openings 148 and jack nuts 149 are provided on mounting flanges 124 (in addition to the fastening openings 125 and the threaded nuts 128) rather than mounting flanges 144. A tool, such as a pry bar, can also be inserted into gaps 1001 between each of the mounting flanges 124 and the mounting flanges 144 to separate (such as by leveraging apart) the second segment 140 from the first segment 120. The present disclosure also contemplates that the second segment 140 can include a lift attachment, such as a lift eye, such that a lift (e.g., a crane or hoist) can lift and lower the second segment 140 to install the second segment 140 on the first segment 120, remove the second segment 140 from the first segment 120, and otherwise maneuver the second segment 140.

Figure 10:
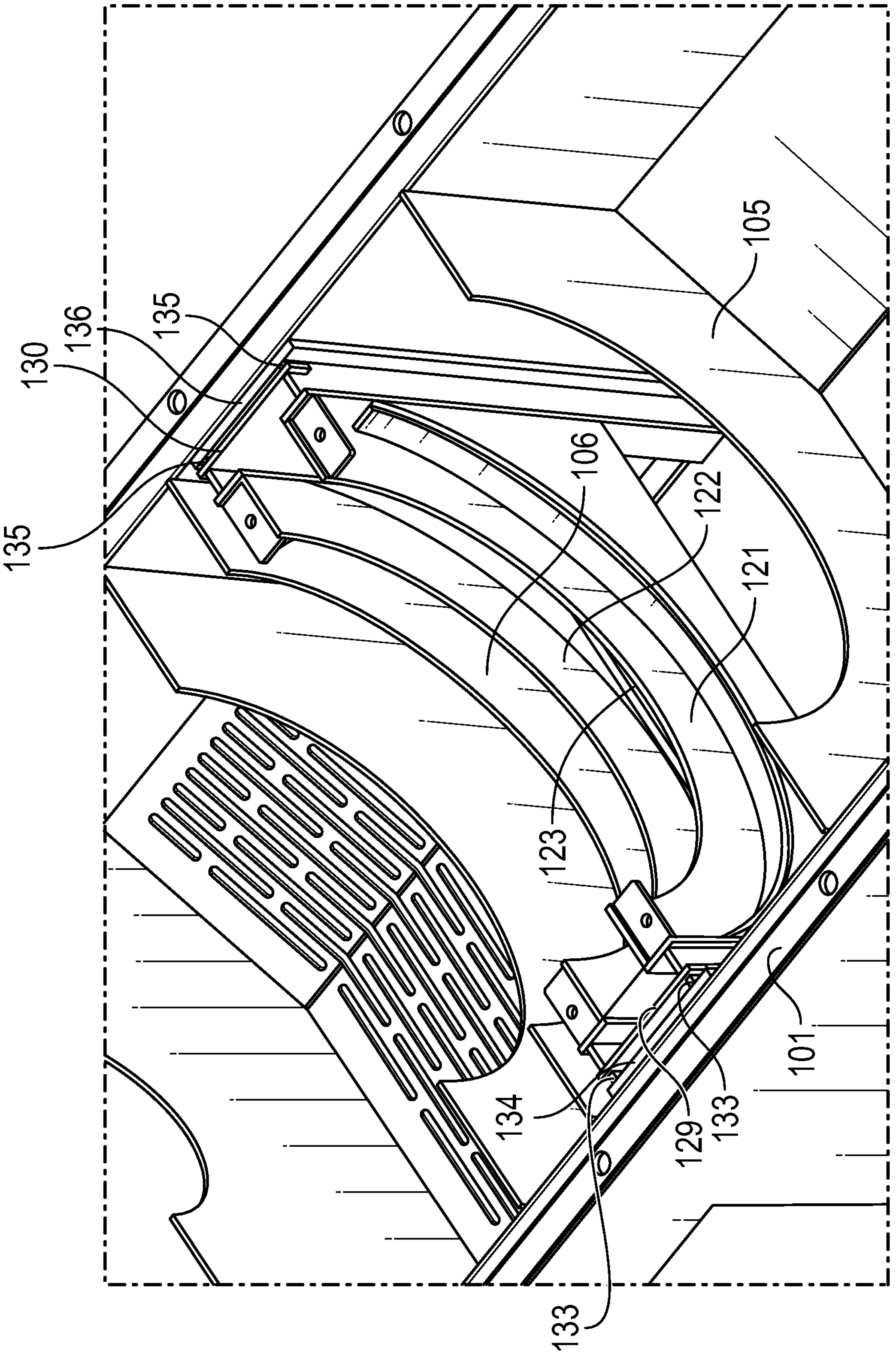
FIG. 10 is a partial isometric view illustrating the lower portion of the baffle assembly installed in a lower portion of the example centrifuge separator.

FIG. 10 is an isometric view of the first segment 120 installed in a lower portion the centrifuge separator 100. To attach the first segment 120 of the baffle assembly 119 to the housing of the centrifuge separator 100, the first segment 120 is lowered between two mount frames 134, 136 such that one or more first protrusions 133 of the first outer section 129 interface with a first mount frame 134 of the centrifuge separator 100, and one or more second protrusions 135 of the second outer section 130 interface with a second mount frame 136 of the centrifuge separator 100. The first mount frame 134 and the second mount frame 136 are attached (e.g., welded) to the lower case 101 of the centrifuge separator 100. The one or more first protrusions 133 protrude outwardly relative to the first outer section 129, and the one or more second protrusions 135 protrude outwardly relative to the second outer section 130. The first segment 120 is lowered until the first and second outer sections 129, 130 respectively contact ledges 137 (shown in FIG. 11) of the first and second mount frames 134, 136. The first and second outer sections 129, 130 of the first frame 192 are then attached to the first and second mount frames 134, 136, respectively. In one or more embodiments, the protrusions 133, 135 can be welded to the first and second mount frames 134/136. In alternate embodiments, the first and second outer sections 129/130 could be attached to the first and second mount frames 134/136 in alternate ways.

The present disclosure contemplates that the second segment 140 and the first segment 120 can be integrally formed as a single piece that is lowered between the two mount frames 134, 136 and attached to the lower case 101. In such an embodiment, portions of the first and second baffles 121, 122 and the middle sections 193*a*, 193*b* can be omitted such that the outer sections 129, 130 can be lowered on opposing sides of the rotatable bowl 107. The single piece and the baffles of the single piece can be U-shaped. The present disclosure also contemplates that the second segment 140 can be attached to the upper case 102 such that the second segment 140 moves with the upper case 102 and is configured to attach to the first segment 120.

Figure 11:
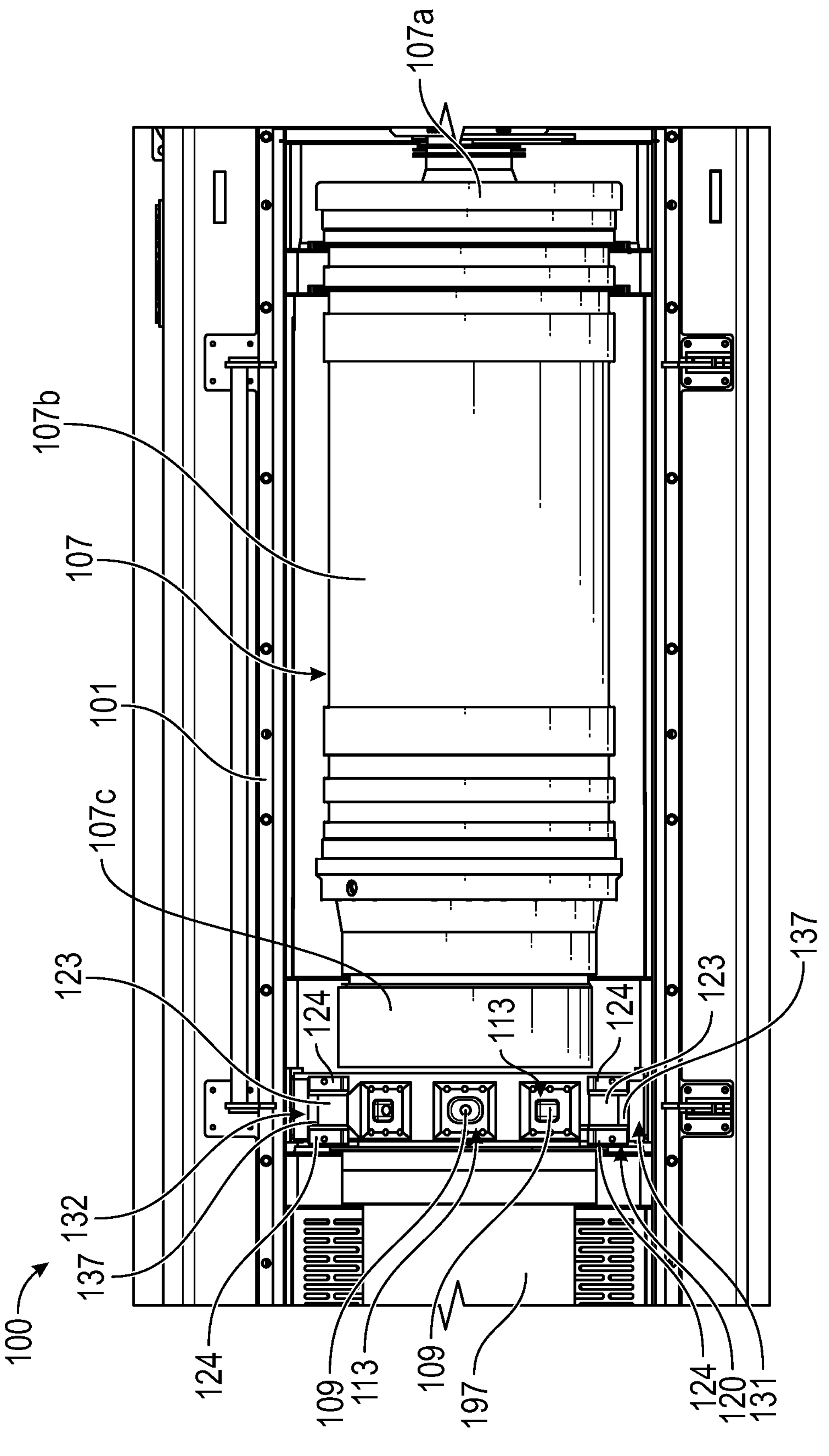
FIG. 11 is a partial top view of the example centrifuge separator with the upper portion of the baffle assembly removed.

FIG. 11 is a top view of the centrifuge separator 100 and the first segment 120 shown in FIGS. 1 to 3, according to one implementation. The first discharge gap 123 of the first segment 120 extends between the second channel 131 and the third channel 132. The solids SO1 discharged from the nozzles 113 can drop through the first discharge gap 123 to a collection bin or conveyer positioned under the nozzles 113.

Figure 12:
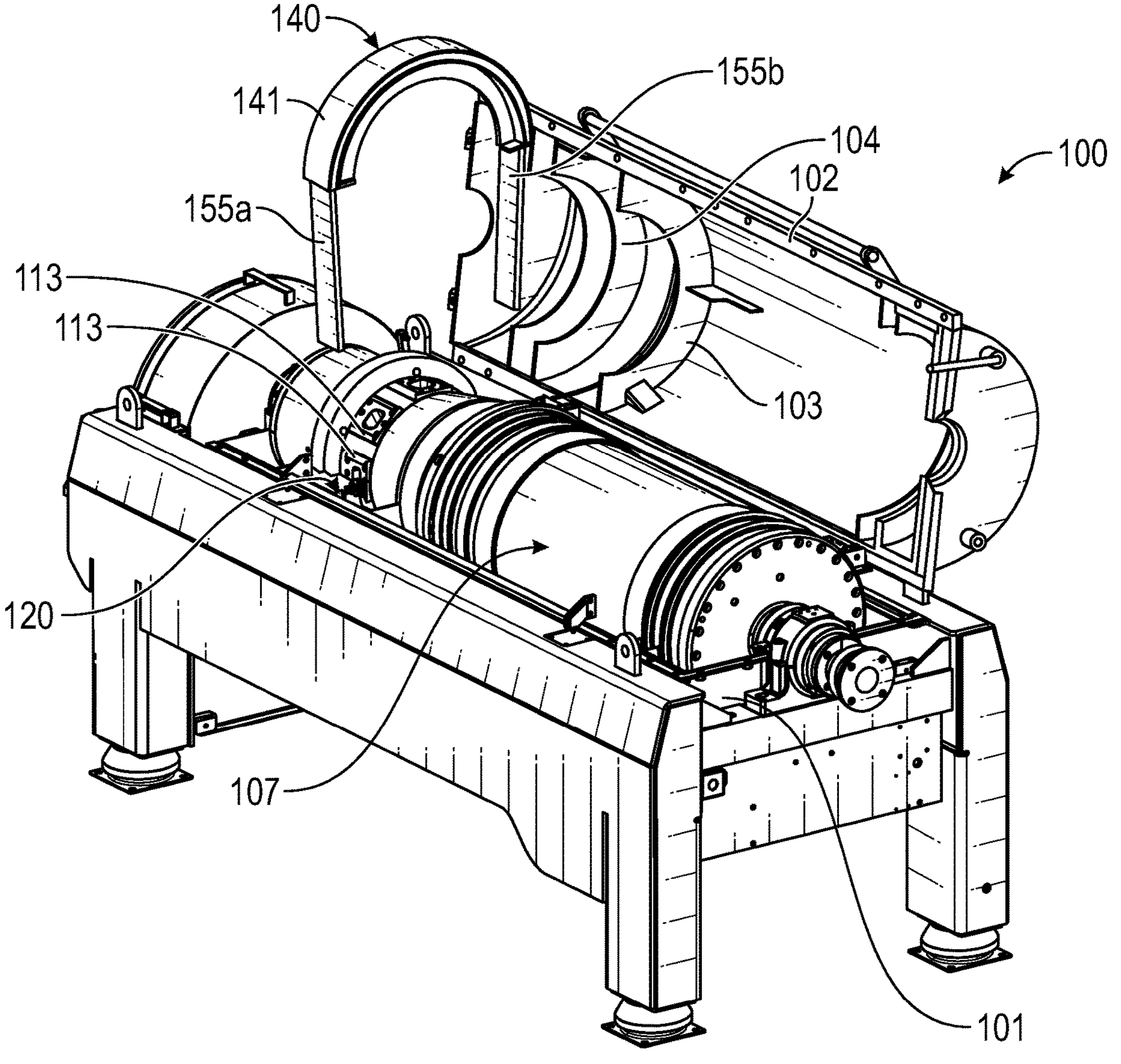
FIG. 12 is an isometric front view of the example centrifuge separator illustrating how the upper portion of the baffle assembly is installed.
Figure 13:
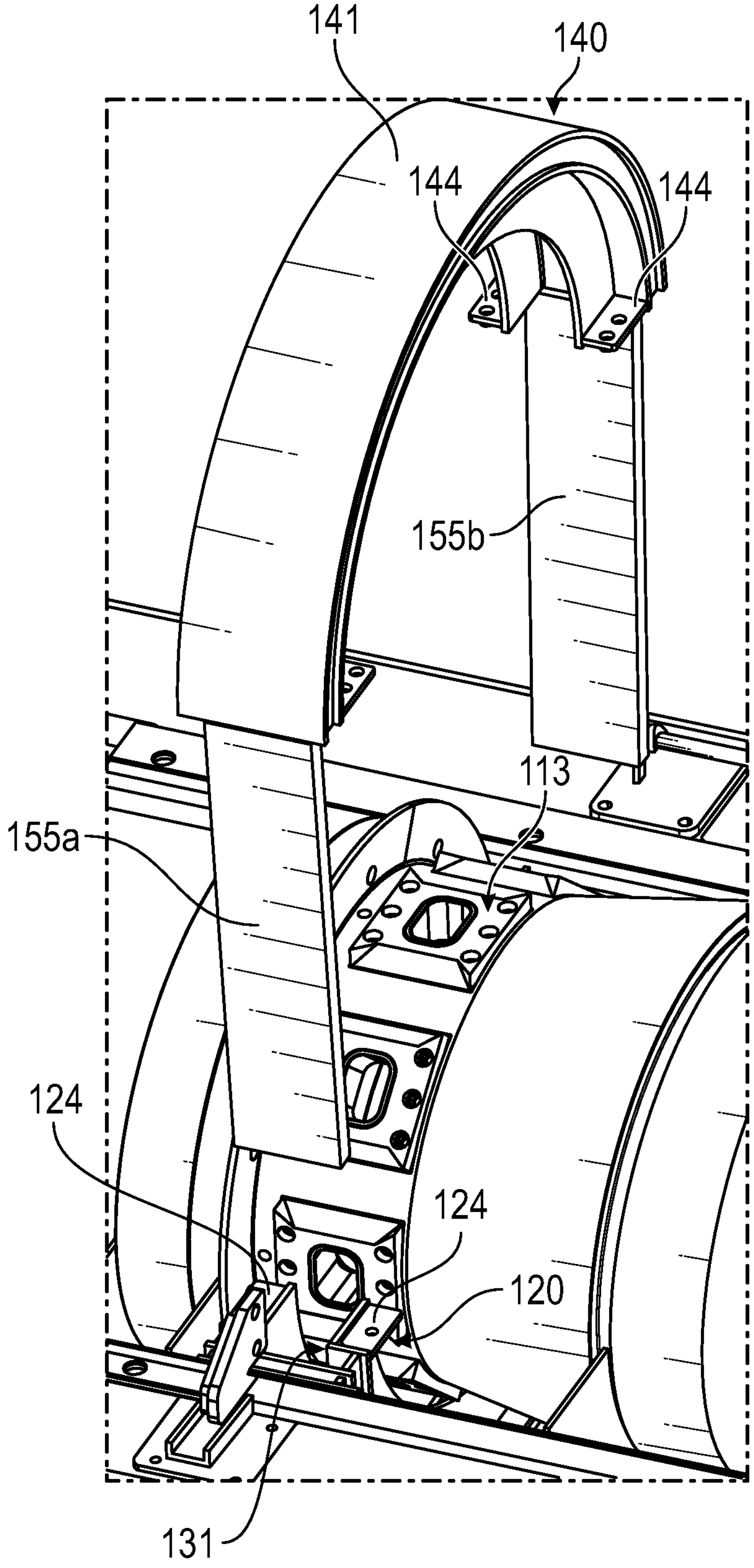
FIG. 13 is a partial isometric view of the example centrifuge separator illustrating how the upper portion of the baffle assembly and the wear liner are installed.

FIG. 12 is an isometric front view of the centrifuge separator 100 shown in FIG. 1, according to one example. FIG. 13 is an isometric view of the centrifuge separator 100 shown in FIG. 12, illustrating how the second segment 140 with an attached wear liner 155 is mounted to the first segment 120 of the baffle assembly 119. As shown in FIGS. 12 and 13, the second segment 140 is positioned above the first segment 120 and above the rotatable bowl 107. The second segment 140 is then lowered toward the first segment 120 while positioning the two liner portions 155*a*, 155*b* respectively into the second channel 131 and the third channel 132 of the first segment 120. The second segment 140 is lowered and the two liner portions 155*a*, 155*b* are fed into the second and third channels 131, 132 until the second segment 140 rests on the first segment 120 and the fastener openings 125 in the flanges 124 on the first segment 120 align with the fastener openings 145 on the flanges 144 on the second segment 140. Fasteners are then be used to attach the second segment 140 to the first segment 120.

Figure 14:
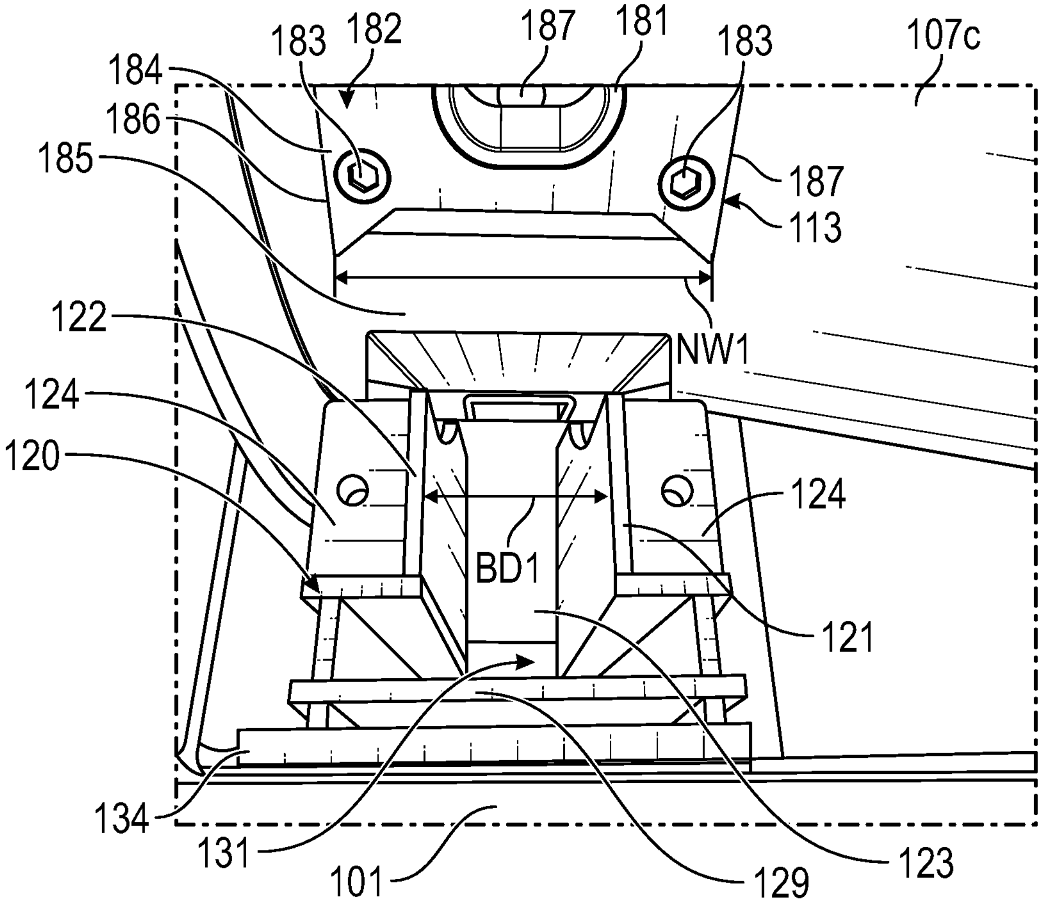
FIG. 14 is a partial top view of the example centrifuge separator illustrating the lower portion of the baffle assembly installed within the centrifuge separator.

FIG. 14 illustrates the first segment 120 adjacent the nozzles 113 of the of the bowl extension 107*c*. Each nozzle 113 includes a nozzle body 181 and a nozzle cover 182. Each nozzle cover 182 is attached to the bowl extension 107*c* of the rotatable bowl 107 using a plurality of fasteners 183. Each nozzle 113 of the plurality of nozzles 113 includes an outer nozzle surface 184 extending outwardly past a bowl outer surface 185 of the bowl extension 107*c*.

Each of the first baffle 121, the second baffle 122, the third baffle 142, and the fourth baffle 143 is aligned between two outer edges 186, 187 of the outer nozzle surface 184 of each nozzle 113 of the plurality of nozzles 113. Each of the first baffle 121, the second baffle 122, the third baffle 142, and the fourth baffle 143 is aligned outwardly of a central opening 187 of each nozzle 113 of the plurality of nozzles 113. A first baffle distance BD1 between the first baffle 121 and the second baffle 122 is less than a nozzle cover width NW1 between the two outer edges 186, 187 of each nozzle cover 182. A second baffle distance BD2 (shown in FIG. 6) between the third baffle 142 and the fourth baffle 143 also is less than the nozzle cover width NW1 between the two outer edges 186, 187 of each nozzle cover 182. The baffle distances BD1, BD2 facilitate efficiency of plowing the discharged solids SO1 to reduce clogging of the segments 120, 140, and containment of the discharged solids SO1 in the segments 120, 140 such that ricochet of the discharged solids SO1 is reduced or eliminated. Other configurations are contemplated for the baffle distances BD1, BD2. The first baffle 121 and the second baffle 122 are at least partially aligned, respectively, with the third baffle 142 and the fourth baffle 143 when the second segment 140 is attached to the first segment 120, as is shown in FIG. 1. In one embodiment, which can be combined with other embodiments, a center of each central opening 187 of each nozzle 113 is aligned with a center of the first baffle distance BD1 and a center of the second baffle distance BD2 when the second segment 140 is attached to the first segment 120.

Figure 15:
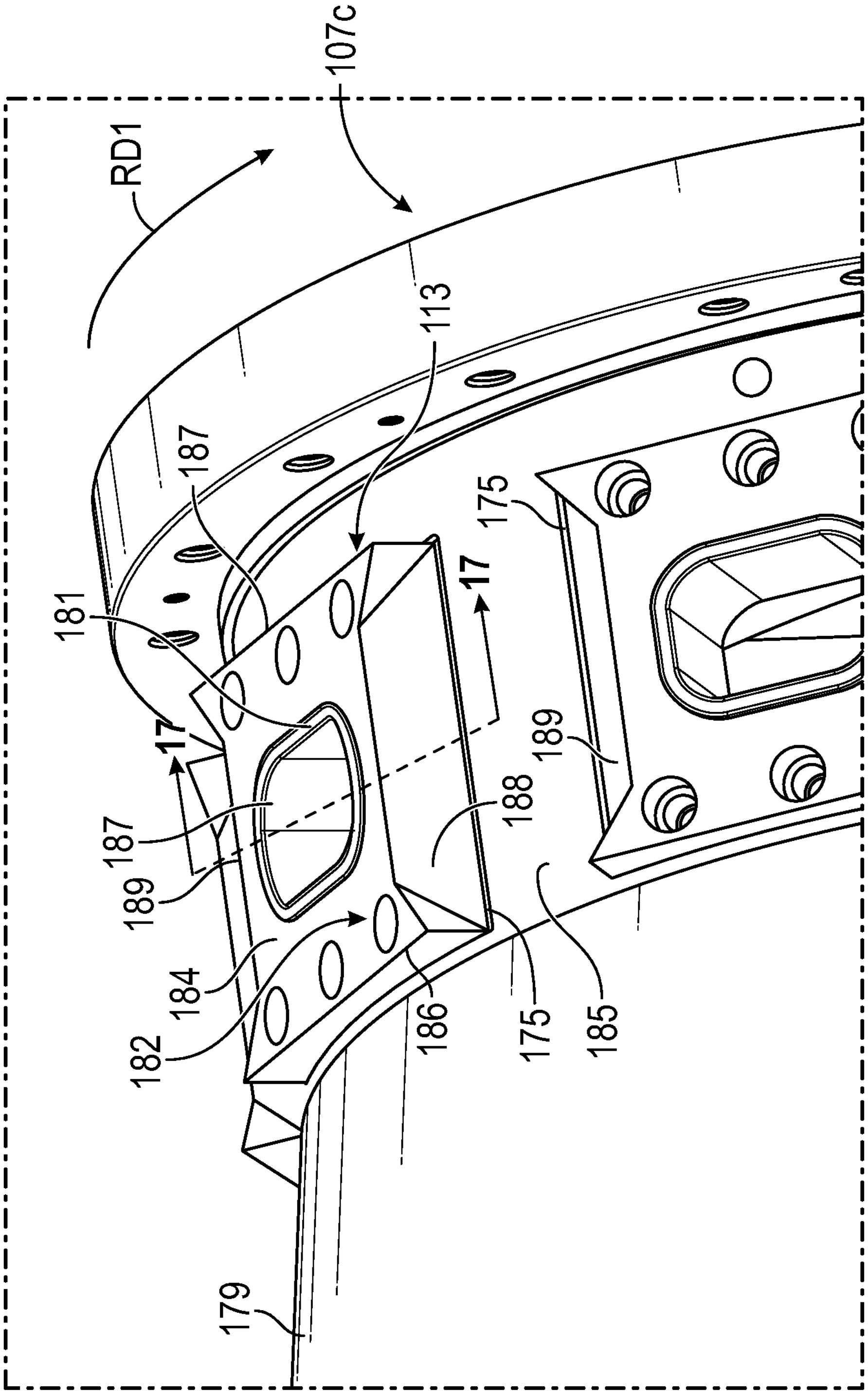
FIG. 15 is a partial isometric side view of a rotatable bowl of the example centrifuge separator illustrating a plurality of nozzles on the rotatable bowl.

FIG. 15 illustrates the plurality of nozzles 113 and the rotatable bowl 107 shown in FIGS. 1 to 3, according to one example. Each nozzle cover 182 of the plurality of nozzles 113 includes two tapered plow surfaces 188, 189 on opposing sides of the respective nozzle cover 182. The tapered plow surfaces 188, 189 plow discharged solids SO1, as the rotatable bowl 107 rotates, to facilitate moving the solids SO1 down through the solid chute 199. The bowl outer surface 185 between adjacent nozzles 113 can be recessed relative to the bowl outer surface 179 of the bowl extension 107*c* to the sides of the nozzles 113. The nozzle covers 182 are reversible such that, if one of the tapered plow surfaces 188, 189 (for example tapered plow surface 188) wears, the respective nozzle cover 182 can be removed, rotated by 180 degrees, and then re-attached to the bowl such that the other of the tapered plow surfaces 188, 189 (for example other tapered plow surface 189) leads in a rotational direction RD1 of the rotatable bowl 107.

The use of the baffle assembly 119 and the raised, protruding nozzles 113 facilitates moving the discharged solids SO1 to the solid chute 199. Also, because the baffle assembly 119 constrains how solids exiting the nozzles 113 can move, solids exiting the nozzles are kept away from the surfaces of the rotating bowl to the sides of the nozzles 113, reducing the wear on such surfaces. For example, the baffle assembly 119 and nozzles 113 facilitate reduced wear of the bowl outer surface 179 to the sides of the nozzles 113. As another example, the baffle assembly 119 and nozzles 113 facilitate reduced wear of inner surfaces 177, 178 (shown in FIG. 2) of the upper case 102. The use of the baffle assembly 119 and the nozzles 113 also facilitates reduced accumulation and ricochet of discharged solids SO1, which can exacerbate wearing of components of the centrifuge separator 100.

Figure 16:
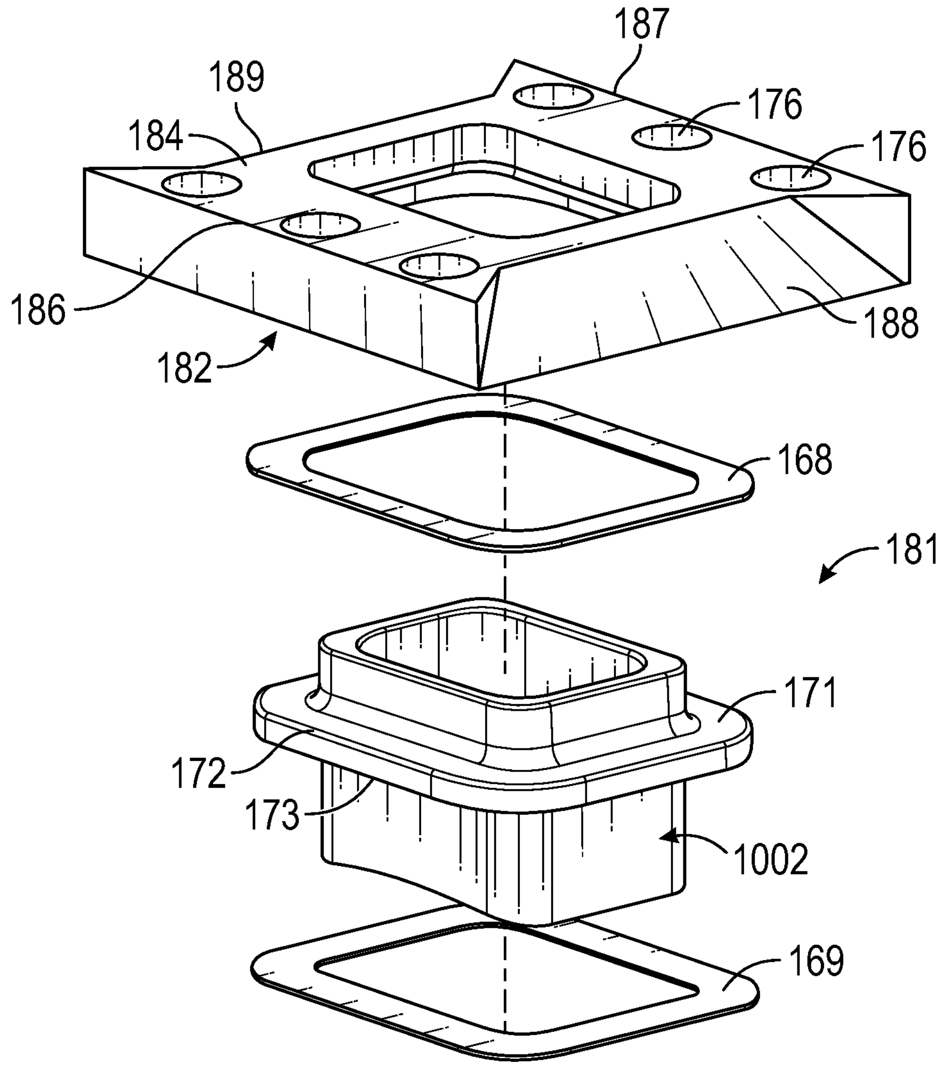
FIG. 16 is a partial isometric exploded view of a nozzle assembly of the example centrifuge separator.

FIG. 16 is an exploded view of a nozzle 113 according to one example. The nozzle cover 182 includes a plurality of fastener openings 176 for the fasteners 183 that attach the nozzle cover 182 to the outer surface 185 of the rotating bowl 107. In one or more embodiments, recesses 175 (see FIG. 15) may be formed on the rotating bowl 107, and each nozzle assembly 113 can be mounted on a recess 175.

The nozzle body 181 includes an outer shoulder 171. The outer shoulder 171 includes first and second beveled surfaces 172, 173. A lower section 1002 of the nozzle body 181 includes a 1.0 degree taper to facilitate installation and removal of the nozzle body 181. Walls of the lower section 1002 may have the taper, and/or outer surfaces of the lower section 1002 may have the taper. The nozzle 113 includes a first cushioning shim 168 for positioning between the nozzle cover 182 and the outer shoulder 171 of the nozzle body 181. The nozzle 113 includes a second cushioning shim 169 for positioning between the outer shoulder 171 and the bowl extension 107*c*. In one embodiment, which can be combined with other embodiments, the nozzle cover 182 is formed of an abrasion resistant material. In one embodiment, which can be combined with other embodiments, the nozzle cover 182 includes a surface coating or a tile formed from the abrasion resistant material. In one example, the abrasion resistant material includes one or more of tungsten carbide and/or a ceramic. Other abrasion resistant materials are also contemplated. The nozzle body 181 is formed of tungsten carbide.

The present disclosure contemplates that the nozzle cover 182 and the nozzle body 181 can be integrated into a single monolithic body such that the first cushioning shim 168 can be omitted.

Figure 17:
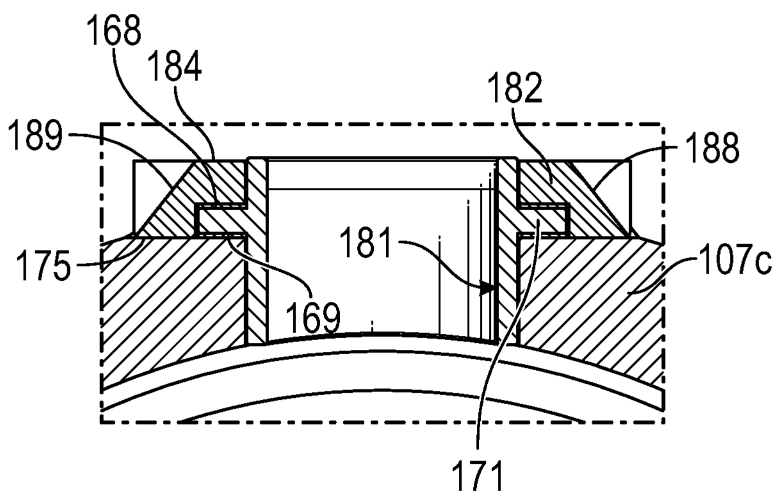
FIG. 17 is a partial cross-sectional view of the nozzle assembly taken along Section 1717 in FIG. 15.

FIG. 17 is a schematic partial front cross-sectional view, along Section 17-17 shown in FIG. 15, of a nozzle 113 attached to the bowl extension 107*c*, according to one implementation.

Figure 18:
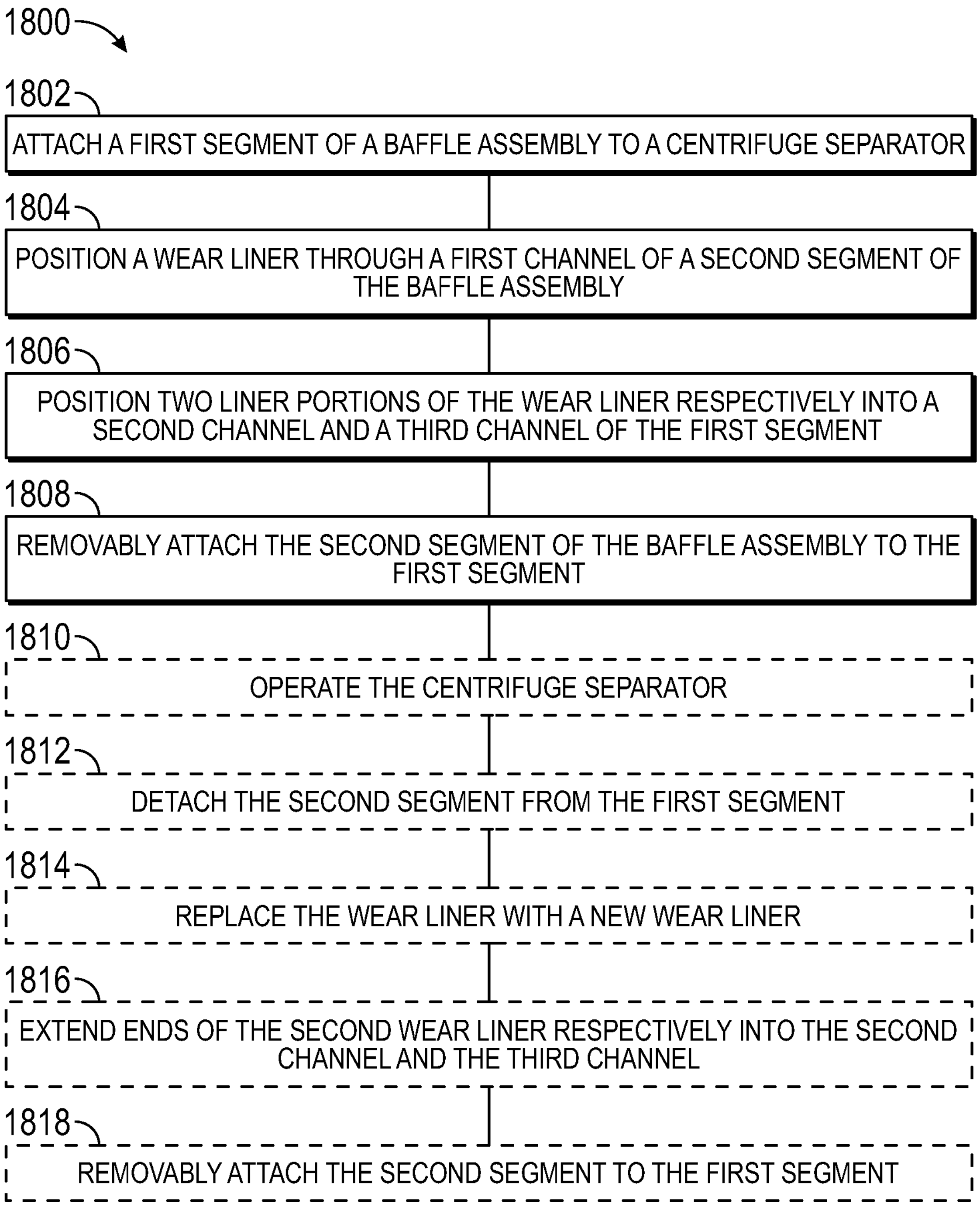
FIG. 18 is a flow diagram of a method of assembling and using a baffle assembly of a centrifuge separator according to an example.

FIG. 18 is a flow diagram of a method 1800 of using a baffle assembly for a centrifuge separator, according to one example. The method 1800 begins at block 1802 when a first segment of the baffle assembly is attached to the centrifuge separator. The first segment is positioned at least partially below a rotatable bowl of the centrifuge separator.

In block 1804, a wear liner is positioned through a first channel of a second segment of the baffle assembly. In block 1806, two liner portions of the wear liner are positioned respectively into a second channel and a third channel of the first segment. Next, in block 1808, the second segment of the baffle assembly is removably attached to the first segment. The second segment is positioned at least partially above the rotatable bowl.

Optional block 1810 includes operating the centrifuge separator to separate a slurry into solid discharges and liquid discharges. The baffle assembly collects and/or deflects the solid discharges during operation of the centrifuge separator to reduce wear on the rotating bowl of the centrifuge separator.

Optional block 1812 includes detaching the second segment from the first segment. In one embodiment, which can be combined with other embodiments, the detaching includes turning one or more jack screws that are disposed through one or more mounting flanges of the first segment or the second segment. The turning of the one or more jack screws facilitates separating of the second segment from the first segment.

Optional block 1814 includes replacing the wear liner in the second segment with a new wear liner. The new wear liner is extended through the first channel of the second segment in a manner similar to the original wear liner.

Optional block 1816 includes extending ends of the new wear liner into the second channel and the third channel of the first segment.

Optional block 1818 includes removably attaching the second segment to the first segment. The second segment is positioned at least partially above the rotatable bowl.

It is contemplated that one or more of the aspects disclosed herein may be combined. Moreover, it is contemplated that one or more of these aspects may include some or all of the benefits mentioned herein. As an example, it is contemplated that one or more of the aspects, features, operations, components, elements, and/or properties of the centrifuge separator 100, the baffle assembly 119, and the nozzles 113 may be combined with one or more of the aspects, features, operations, components, elements, and/or properties of the method 1800.

Conditional language, such as, “can,” “could,” “might,” or “may,” unless specifically stated otherwise, or otherwise understood within the context as used, is generally intended to convey that certain implementations could, but do not necessarily, include certain features and/or elements while other implementations may not. Thus, such conditional language generally is not intended to imply that features and/or elements are in any way required for one or more implementations or that one or more implementations necessarily include these features and/or elements. It is also intended that, unless expressly stated, the features and/or elements presented in certain implementations may be used in combination with other features and/or elements disclosed herein.

The present disclosure contemplates that the use of terms such as “attached,” “attaches,” and/or “attaching” can include direct attaching and/or indirect attaching, such as attaching through other components. The present disclosure also contemplates that the use of terms such as “attached,” “attaches,” and/or “attaching” can include but are not limited to connecting, welding, interference fitting, brazing, and/or fastening using fasteners (such as pins, rivets, screws, bolts, and/or nuts). The present disclosure contemplates that the use of terms such as “attached,” “attaches,” and/or “attaching” can include but are not limited to components being integrally formed together as a unitary body.

The specification and annexed drawings disclose example embodiments of the present disclosure. Detail features shown in the drawings may be enlarged herein to more clearly depict the features. Thus, the drawings are not necessarily precisely to scale. Additionally, the examples illustrate various features of the disclosure, but those of ordinary skill in the art will recognize that many further combinations and permutations of the disclosed features are possible. Accordingly, various modifications may be made to the disclosure without departing from the scope or spirit thereof. Further, other implementations and embodiments may be apparent from the specification and annexed drawings, and the practice of disclosed implementations and embodiments as presented herein. Examples disclosed in the specification and the annexed drawings should be considered, in all respects, as illustrative and not limiting. Although specific terms are employed herein, they are used in a generic and descriptive sense only, and not intended to the limit the present disclosure. The present disclosure contemplates that one or more aspects of the implementations and embodiments described herein may be substituted in for, or used in addition to, other aspects described.

What is claimed is:

1. A two-piece baffle assembly configured to be positioned around discharge nozzles of a centrifuge separator, comprising:
- a first segment, comprising:
  - a first frame,
  - a first baffle mounted to the first frame, and
  - a second baffle mounted to the first frame such that a first discharge gap is formed between the first baffle and the second baffle;
- a second segment comprising:
  - a second frame having an arcuate shape,
  - a third baffle mounted to the second frame,
  - a fourth baffle mounted to the second frame, wherein the third and fourth baffles extend inwardly relative to the second frame and wherein a second discharge gap is formed between the third and fourth baffles, and
  - a first arcuate channel defined at least partially by the arcuate shaped second frame;
- a wear liner extending through the first channel of the second segment, wherein the wear liner is configured such that when the wear liner is mounted in the first channel, two opposite end portions of the wear liner extend outward away from the second segment; and
- an attachment arrangement for attaching the first segment to the second segment.

2. The two-piece baffle assembly of claim 1, wherein the first, second, third and fourth baffles are configured such that when the first segment is attached to the second segment, inner edges of the first and third baffles substantially form a circle and inner edges of the second and fourth baffles substantially form a circle.

3. The two-piece baffle assembly of claim 1, wherein the attachment arrangement comprises:
- one or more first mounting flanges of the first segment, each first mounting flange having one or more fastener openings therethrough; and
- one or more second mounting flanges of the second segment, each second mounting flange having one or more fastener openings therethrough.

4. The two-piece baffle assembly of claim 3, wherein the one or more first mounting flanges are mounted to the first segment and the one or more second mounting flanges are mounted to the second segment such that when the first and second segments are brought together, the fastener openings of the first mounting flanges align with corresponding fastener openings of the second mounting flanges.

5. The two-piece baffle assembly of claim 1, wherein the first segment further comprises:
- a first outer section positioned outwardly of a first side of the first baffle and the second baffle; and
- a second outer section positioned outwardly of a second side of the first baffle and the second baffle.

6. The two-piece baffle assembly of claim 5, wherein the first segment further comprises:
- a second channel defined at least partially by the first outer section; and
- a third channel defined at least partially by the second outer section, wherein each of the second and third channels is configured to receive a respective end portion of the wear liner mounted in the first channel of the second segment.

7. The two-piece baffle assembly of claim 5, wherein the first outer section comprises one or more first protrusions protruding outwardly relative to the first outer section and configured to interface with a first mount frame of the centrifuge separator, and the second outer section comprises one or more second protrusions protruding outwardly relative to the second outer section and configured to interface with a second mount frame of the centrifuge separator.

8. The two-piece baffle assembly of claim 1, wherein the each of the first baffle, the second baffle, the third baffle and the fourth baffle are configured such that when the two-piece baffle assembly is positioned around discharge nozzles of a centrifuge separator, the baffles are aligned between two outer edges of an outer nozzle surface of each nozzle of the solid discharge assembly.

9. A centrifuge separator, comprising:
- a centrifuge frame;
- a bowl that is rotatably mounted to the centrifuge frame, wherein a plurality of solid discharge nozzles are installed on the bowl and configured to discharge solids from an interior to an exterior of the bowl while the bowl is rotating, wherein each nozzle of the solid discharge nozzles comprises an outer nozzle surface extending outwardly past a bowl outer surface of the rotatable bowl;
- a two-piece baffle assembly that is independent of the centrifuge frame, mounted to the centrifuge frame, and at least partially surrounding a portion of the bowl in which the solid discharge nozzles are mounted, the two-piece baffle assembly being configured to constrain how solids discharged from the solid discharge nozzles can move, wherein the two-piece baffle assembly comprises:
  - a first segment mounted to the centrifuge frame and comprising:
    - a first frame, and
    - first and second baffles mounted to the first frame such that a first discharge gap is formed between the first and second baffles, wherein the first segment is mounted to the centrifuge frame such that the first discharge gap is positioned over the solid discharge nozzles; and
  - a second segment secured to the first segment and comprising:
    - a second frame having an arcuate shape, and
    - third and fourth baffles mounted to the second frame such that a second discharge gap is formed between the third and fourth baffles, wherein the second segment is located such that the second discharge gap formed between the third and fourth baffles is positioned over the discharge nozzles, and wherein each of the first baffle, the second baffle, the third baffle, and the fourth baffle is aligned between two outer edges of the outer nozzle surface of each nozzle of the solid discharge nozzles.

10. The centrifuge separator of claim 9, wherein each nozzle of the solid discharge nozzles comprises a nozzle body and a nozzle cover.

11. The centrifuge separator of claim 9, wherein each of the first baffle, the second baffle, the third baffle, and the fourth baffle is aligned outwardly of a central opening of each nozzle of the solid discharge nozzles.

12. The centrifuge separator of claim 9, wherein a first arcuate channel is defined at least partially by the arcuate shaped second frame, the two-piece baffle assembly further comprising a wear liner extending through the first arcuate channel of the second segment, wherein the wear liner is configured such that when the wear liner is mounted in the first arcuate channel, two opposite end portions of the wear liner extend outward away from the second segment.

13. The centrifuge separator of claim 12, wherein the first segment further comprises:

a first outer section positioned outwardly of a first side of the first baffle and the second baffle; and a second outer section positioned outwardly of a second side of the first baffle and the second baffle.

14. The centrifuge separator of claim 13, wherein the first segment further comprises:

a second channel defined at least partially by the first outer section; and a third channel defined at least partially by the second outer section, wherein each of the second and third channels is configured to receive a respective end portion of a wear liner mounted in the first arcuate channel of the second segment.

* * * * *